United States Patent [19]

Osterloh

[11] Patent Number: 4,971,707
[45] Date of Patent: * Nov. 20, 1990

[54] METHOD OF PRODUCING OIL-IN-WATER MICROEMULSIONS

[75] Inventor: William T. Osterloh, Missouri City, Tex.

[73] Assignee: Texaco Inc., White Plains, N.Y.

[*] Notice: The portion of the term of this patent subsequent to Aug. 7, 2007 has been disclaimed.

[21] Appl. No.: 200,873

[22] Filed: Jun. 1, 1988

Related U.S. Application Data

[63] Continuation-in-part of Ser. No. 944,894, Dec. 22, 1986, abandoned.

[51] Int. Cl.$^5$ ............................ E21B 43/22; B01F 3/08
[52] U.S. Cl. ................................ 252/8.554; 252/312; 252/314; 166/275
[58] Field of Search ................... 252/8.554, 312, 314; 166/275

[56] References Cited

U.S. PATENT DOCUMENTS

| | | | |
|---|---|---|---|
| 3,506,070 | 4/1970 | Jones | 252/8.554 X |
| 3,981,361 | 9/1976 | Healy | 252/8.554 X |
| 3,983,940 | 10/1976 | Carpenter et al. | 252/8.554 X |
| 4,239,628 | 12/1980 | Vinatieri | 252/8.554 |
| 4,258,789 | 5/1981 | Hedges et al. | 252/8.554 X |
| 4,271,907 | 6/1981 | Gale | 166/275 X |
| 4,318,816 | 3/1982 | Schievelbein | 252/8.554 |
| 4,635,722 | 1/1987 | Carlin | 252/8.554 X |

OTHER PUBLICATIONS

Nelson, R. C. & Pope, G. A., "Phase Relationships in Chemical Flooding," Soc. Petrol. Eng. Journal (Oct., 1978) pp. 325–338.

Nelson, R. C., "The Salinity Requirement Diagram-a Useful Tool in Chemical Flooding Research and Development," Soc. Petr. Eng. Paper 8824 (1980).

*Primary Examiner*—Robert L. Stoll
*Assistant Examiner*—Gary L. Geist
*Attorney, Agent, or Firm*—Jack H. Park; Kenneth R. Priem; Harold J. Delhommer

[57] ABSTRACT

A method for producing a homogeneous oil-in-water microemulsion by first creating a surfactant, oil and water mixture, adding salt to the mixture in a sufficient quantity to drive the mixture into a Type III or Type II(+) phase regime, preparing a solution having a selected salinity lower than the salinity of the Type III or Type II(+) phase regime, and mixing a sufficient amount of the lower salinity solution with the Type III or Type II(+) regime to invert the Type III or Type II(+) regime into a Type II(−) oil-in-water microemulsion. The microemulsion may be used in a surfactant flood to recover hydrocarbons from underground formations.

15 Claims, No Drawings

METHOD OF PRODUCING OIL-IN-WATER MICROEMULSIONS

This is a continuation-in-part of U.S. patent application Ser. No. 06/944,894, filed Dec. 22, 1986, now abandoned. This invention relates to a method for producing a homogeneous oil-in-water microemulsion comprised of oil, brine and surfactant. The oil and water microemulsion may be employed in a surfactant flood to recover hydrocarbons from an underground formation.

BACKGROUND OF THE INVENTION

Microemulsions may be used for different chemical purposes. One well known use for oil-in-water microemulsions is to conduct surfactant floods to recover oil from underground formations. It is also believed that oil-in-water microemulsions generally perform better for hydrocarbon recovery when they are formulated with high alkane carbon number (ACN) oil. Such high ACN oils typically have an ACN 50% to 300% higher than the ACN of the crude oil for which the microemulsion is optimized.

The literature teaches the advantages of using low oil content microemulsions for enhanced oil recovery which are formulated with high ACN oils. U.S. Pat. No. 4,318,816 demonstrates that the stability of a single component surfactant such as an alkylarylpolyalkoxyalkylene sulfonate is enhanced when a high ACN oil is added to an aqueous surfactant to form an oil-in-water microemulsion. The high ACN oil raises the phase inversion temperature of the ethoxylated surfactant. U.S. Pat. No. 4,271,907 teaches that water soluble polymers are compatibly incorporated into an optimized microemulsion only when the microemulsion is formulated with a high ACN oil.

However, oil-in-water microemulsions are difficult to economically produce in the field on a field-wide scale. This difficulty is enhanced when high ACN oil is used to create the oil-in-water microemulsion. One known method of creating a water-in-oil emulsion with alkoxylated surfactants is to heat and then cool the mixture of surfactant, high ACN oil and brine. When heated, a water-in-oil microemulsion is formed because the alkoxylated surfactants become more hydrophobic as the temperature is increased. Upon cooling, the system is inverted to form a stable, translucent, oil-in-water microemulsion. This method is not practical in the field because large volumes of fluid must be heated to 20° to 50° C. above reservoir temperature.

A second method of producing stable oil-in-water microemulsions is to subject the mixture of surfactant, high ACN oil and brine to a very high shear. For example, a microemulsion having particle sizes less than 100 nm can be formed after multiple passes through a shear device having a pressure drop of about 14,000 psi. Since practical pressure drops obtainable in the field approach only about 2,000 psi, extensive shearing would be required to yield injectable oil-in-water microemulsions.

SUMMARY OF THE INVENTION

The invention is a method for producing a homogeneous oil-in-water microemulsion comprised of oil, brine and surfactant. The microemulsion is produced by first creating a surfactant, oil and brine mixture or surfactant, oil and fresh water mixture. Salt is added to the surfactant, oil and water mixture in a sufficient quantity to drive the mixture into a Type III or Type II(+) phase regime. A solution is then prepared having a selected salinity which is lower than the salinity of the Type III or Type II(+) phase regime. Finally, a sufficient amount of the solution with a lower salinity is mixed with the Type III or Type II(+) phase regime to invert the phase environment of the Type III or Type II(+) regime to a Type II(−) oil-in-water microemulsion. The salinities and concentrations of surfactant and oil in all solutions and mixtures are selected so that the final microemulsion will contain the desired optimal salinity and desired surfactant and oil concentrations. The microemulsion may be used in a surfactant flood to recover crude oil from underground hydrocarbon formations.

DETAILED DESCRIPTION

Recent research into microemulsion chemistry has resulted in the widespread use of the phase regime descriptors Type II(+), Type II(−), and Type III. In a Type II(−) phase regime, two equilibrium phases are present. One phase is essentially pure oil and the second phase is a homogeneous phase containing surfactant, brine and oil. Because the tie-lines in the two-phase region have a negative slope, this phase environment is called a Type II(−).

A Type II(+) phase regime is similar to a Type II(−) phase regime in that the maximum number of equilibrium phases is two. However, the tie-lines in the two-phase region of a Type II(+) phase environment have a positive slope. In the Type II(+) regime, one phase is aqueous and the second phase is the homogeneous phase containing surfactant, brine and oil. In a Type III phase environment, the maximum number of equilibrium phases that can occur throughout any area of the phase diagram is three.

As salinity increases in a system, there is a steady progression from Type II(−) to Type III to Type II(+) phase behavior. At relatively lower salinities, Type II(−) phase behavior is noticed, wherein the surfactant is partitioned predominantly into the aqueous phase. At relatively higher salinities, Type II(+) phase behavior occurs wherein surfactant is partitioned predominantly into the oleic phase.

Additional discussion on these well-known phase regime terms can be found in: Nelson, R. C., Pope, G. A., "Phase Relationships in Chemical Flooding," Society of Petroleum Engineers Journal, October 1978, pp. 325–338; Davis, Jr., L. A., Tyler, T. M., Brost, D. F., and Haskin, H. K., "Characterization of Surfactants Using A Scaling Law Interpretation of Coreflood Residual Oil Saturation Profiles," Society of Petroleum Engineers Journal, June 1983, pp. 511–518; Hirasaki, G. J., van Domselaar, H. R., Nelson, R. C., "Evaluation of the Salinity Gradient Concept in Surfactant Flooding," Society of Petroleum Engineers Journal, June 1983, pp. 486–500; and Nelson, R. C., "The Salinity Requirement Diagram—A Useful Tool In Chemical Flooding Research and Development," SPE Paper No. 8824, presented at the First Joint SPE/DOE Symposium on Enhanced Oil Recovery at Tulsa, Okla., Apr. 20–23, 1980.

The invention method of producing homogeneous oil-in-water microemulsions is a method ideally suited for field operations in that the method does not require heat or extensive shearing. Production costs are substantially lower than other field methods which can be employed to produce such microemulsions. In addition, the method is fast and does not adversely affect the performance of the microemulsion.

In implementing this method, the surfactant microemulsion is first optimized for the particular reservoir using techniques well known to those skilled in the art of surfactant and polymer enhanced oil recovery. Once the system is defined, the amount of added salt required to produce a Type III or Type II(+) phase environment with a surfactant, high ACN oil mixture can also be easily determined by those skilled in the art of surfactant, oil and brine phase behavior.

More specifically, a surfactant, oil and brine mixture or surfactant, oil and fresh water mixture is first created with an oil having an ACN higher than the crude oil for which the surfactant system is optimized. Preferably, the oil will have an ACN which is 50%–300% higher than the crude oil. A sufficient amount of salt is added to the surfactant, oil and brine mixture to drive the surfactant, higher ACN oil and brine mixture into a Type III or Type II(+) phase regime. Typically, the salinity of this regime is from 25%–150% greater than the salinity of the field brine, or the brine for which the system is optimized.

A solution is prepared which has a selected salinity lower than the salinity of the Type III or Type II(+) regime. The Type III or Type II(+) regime is then mixed with a sufficient amount of the lower salinity solution to invert the phase environment to a Type II(−) oil-in-water microemulsion having the desired final salinity and surfactant and oil concentration. Preferably, the salt is added to the surfactant concentrate, oil and field brine mixture, followed by the addition of fresh water to adjust the salinity back down to the optimum level.

The oil incorporated into the microemulsion should have an ACN higher than the crude oil for which the surfactant system is optimized. If the incorporated oil has an ACN lower than the crude, the resulting injection microemulsion will be an upper phase microemulsion and all of the surfactant will partition into the upper Type II(+) phase. If the incorporated oil has an ACN equal to the ACN of the crude oil, the final injection microemulsion will be a Type III. Such a Type III microemulsion is uneconomical for enhanced oil recovery because it requires much larger quantities of oil in the microemulsion.

The type of salt used in this method depends upon the type of surfactant used. The phase behavior of alkoxylated surfactants is relatively insensitive to the molar ratio of monovalent to divalent cations. Thus, when alkoxylated surfactants are employed, any monovalent salt can be used to create the Type III or Type II(+) phase environment or to invert the phase environment to a Type II(−) environment. It is not necessary to be concerned with divalent cations with alkoxylated surfactants. As a first approximation, the optimal salinity will be obtained if the final total cation molality is equal to the total cation molality of the original brine for which the alkoxylated surfactant was optimized.

However, if the phase behavior of the surfactant is significantly dependent upon the monovalent to divalent cation ratio, the salt should be supplemented with divalent cations to reach the appropriate ratio. Divalent cations which may be added to the mixture or Type III or Type II(+) phase environment include calcium, magnesium, strontium, and barium. Monovalent salts that may be employed in the method include sodium chloride, potassium chloride, and lithium chloride.

High ACN oils may have pour points higher than the ambient temperature used in the preparation of microemulsions. In such a case, some heating may be required in the first step of the process to create the oil, surfactant and brine mixture. Although this increases the cost of the method, only a fraction of the overall injected microemulsion must be heated.

This invention process can be used with both high salinity and low salinity microemulsions, and with both single component and multiple component surfactant systems. The method is applicable to anionic, cationic, amphoteric, and nonionic surfactants. Additionally, water soluble polymers may also be added to the oil-in-water microemulsion to increase the viscosity and recovery efficiency of the microemulsion when injected into a reservoir.

Oil-in-water microemulsions can be very efficient at recovering crude oil from underground hydrocarbon formations when used in a surfactant flood. Typically, the microemulsion is injected into the formation through one or more injection wells and pushed towards one or more production wells by a drive fluid injected after the microemulsion. Different drive fluids are well known in the art. They may be water, gas, or water with a viscosifying polymer. Crude oil and other fluids are recovered from one or more production wells.

The following examples further illustrate the novel method of producing a homogeneous oil-in-water microemulsion. These examples are given by way of illustration and not as limitations on the scope of the invention. Thus, it should be understood that the steps and materials employed in the instant method may be varied to achieve similar results within the scope of the invention.

EXAMPLE 1

An oil-in-water microemulsion was optimized with reservoir crude oil at 47° C. in a 190,000 ppm TDS field brine having a monovalent to divalent cation ratio of 22. The crude oil had an ACN of about 7.5. The final injection microemulsion was comprised of:

| | |
|---|---|
| 3.0 wt. % | sodium alkypolyalkoxy sulfate, |
| 1.5 wt. % | isopropanol, |
| 4.0 wt. % | n-tetradecane, and |
| 91.5 wt. % | brine of 190,000 ppm TDS |

To prepare the microemulsion according to the invention, 11.54 grams of 26% active sodium alkypolyalkoxy sulfate, 1.5 grams of isopropanol, and 4.0 grams of n-tetradecane were mixed in a capped jar to create a surfactant, oil and water mixture. 3.0 grams of sodium chloride were added to the mixture to drive the mixture into a Type II(+) phase regime. 116,000 ppm TDS brine was prepared having a salinity lower than the Type II(+) phase regime. While the solution was being stirred, 78.46 grams of the 116,000 ppm TDS brine was added in portions over a period of about 10 minutes. The addition of this selected lower salinity solution inverted the phase environment of the Type II(+) phase regime to a Type II(−) oil-in-water microemulsion, which was clear, stable and homogeneous.

EXAMPLE 2

The microemulsion described in Example 1 was prepared according to the invention process except that it did not contain any isopropanol. The Type II(+) phase regime solution was prepared as in Example 1. While the solution was being stirred, 79.96 grams of the 116,000 ppm TDS brine was added in portions. The addition of the selected lower salinity brine inverted the phase environment of the Type II(+) phase regime to a Type II(−) oil-in-water microemulsion, which was clear, stable and homogeneous.

EXAMPLE 3

The microemulsion described in Example 2 was prepared, except that the oil was changed from n-tetradecane to a refinery stream having a pour point of about 32° C. To overcome the pour point problem, the solution was heated to about 65° C. in the first step of creating a surfactant, oil and water mixture. Upon the addition of the 116,000 ppm TDS brine, the Type II(+) regime was inverted to a Type II(−) phase regime. A clear and stable, homogeneous oil-in-water microemulsion was produced.

EXAMPLE 4

An oil-in-water microemulsion was optimized with n-octane at 23° C. in 5,000 ppm TDS sodium chloride brine. The final injection microemulsion was comprised of:

3.0 wt. % Enordet LXS-1112,
3.0 wt. % sec-butanol,
2.0 wt. % n-tetradecane, and
92.0 wt. % 5,000 ppm TDS sodium chloride brine.

To produce the injection microemulsion, 15.0 grams of 20% active Enordet LXS-1112, 3.0 grams of sec-butanol, 2.0 grams of n-tetradecane, 0.46 grams of sodium chloride and 1.64 grams of distilled water were placed in a capped jar and stirred for 10 to 15 minutes to create a Type II(+) phase regime. Enordet LXS-1112 is a trademarked alkyl ortho-xylene sulfonate sold by Shell Chemical Co.

While the solution was being stirred, 79.95 grams of distilled water were added in portions over a period of about 10 minutes. The addition of distilled water having the selected lower salinity inverted the Type II(+) regime into a Type II(−) oil-in-water microemulsion. A clear and stable, homogeneous microemulsion was produced.

EXAMPLE 5

An oil-in-water microemulsion was optimized with crude oil at 25° C. in 74,000 ppm TDS field brine. The brine had a monovalent to divalent ratio of 9.14. The crude oil had an ACN of about 8. The optimized concentrations in the oil-in-water injection microemulsion were:

| | |
|---|---|
| 1.8 wt. % | Enordet LXS-16, |
| 2.2 wt. % | LN-60COS, |
| 3.0 wt. % | isopropanol, |
| 2.0 wt. % | n-dodecane, and |
| 92.0 wt. % | 74,000 ppm TDS field brine. |

Enordet LSX-16 is a trademarked alkyl ortho-xylene sulfonate sold by Shell Chemical Co. LN-60COS is a trademarked sulfated derivative of ethoxylated alcohol having approximately 12 to 14 carbon atoms and an average equivalent weight of about 550 sold by Texaco Chemical Co.

To produce the injection microemulsion by the invention method, 9.47 grams of 19% active Enordet LSX-16, 3.73 grams of 59% active LN-60COS, 3.0 grams of isopropanol, 2.0 grams of n-dodecane and 40.49 grams of a 149,500 ppm TDS field brine having a monovalent to divalent cation ratio of 9.14 were all placed in a capped jar and stirred for 10 to 15 minutes. This yielded a Type II(+) phase regime microemulsion.

While stirring, 41.32 grams of distilled water were added in portions over a period of about 10 minutes. The addition of distilled water having the selected salinity lower than the Type II(+) regime inverted the Type II(+) regime into a Type II(−) oil-in-water microemulsion. A clear and stable, homogeneous microemulsion was produced.

Many other variations and modifications may be made in the concepts described above by those skilled in the art without departing from the concepts of the present invention. Accordingly, it should be clearly understood that the concepts disclosed in the description are illustrative only, and are not intended as limitations on the scope of the invention.

What is claimed is:

1. A method for producing a homogeneous oil-in-water microemulsion comprised of oil, brine and surfactant for recovering crude oil and hydrocarbons from underground hydrocarbon formations, which comprises:

mixing a surfactant, an oil and water to create a surfactant, oil and water mixture;

said oil having an alkane carbon number higher than the crude oil for which the microemulsion is optimized;

adding a sufficient amount of salt to the surfactant, oil and water mixture to drive the surfactant, oil and water mixture into a Type III or Type II(+) phase regime;

preparing a solution having a selected salinity lower than the salinity of the Type III or Type II(+) regime;

mixing a sufficient amount of said selected salinity solution with the Type III or Type II(+) regime to invert the phase environment of the Type III or Type II(+) regime into a Type II(−) oil-in-water microemulsion.

2. The method of claim 1, wherein the oil has an alkane carbon number about 50% to about 300% higher than the alkane carbon number of the crude oil.

3. The method of claim 1, wherein the surfactant, oil and water mixture contains a single surfactant.

4. The method of claim 1, wherein the surfactant, oil and water mixture contains multiple surfactants.

5. The method of claim 1, further comprising adding water soluble polymers to the oil-in-water microemulsion to increase the viscosity of the microemulsion.

6. The method of claim 1, further comprising heating the oil used to make the surfactant, oil and water mixture when the oil has a pour point greater than ambient temperature.

7. The method of claim 1, wherein the surfactant is anionic, cationic, amphoteric or nonionic.

8. The method of claim 1, wherein the salt added to the mixture to produce a Type III or Type II(+) phase environment is sodium chloride, potassium chloride, or lithium chloride.

9. The method of claim 8, further comprising adding divalent cations of calcium, magnesium, strontium, or barium to the mixture.

10. The method of claim 1, further comprising adding a salt of sodium chloride, potassium chloride, or lithium chloride to water to create the solution having a selected salinity lower than the Type III or Type II(+) solution.

11. The method of claim 1, further comprising adding divalent cations of calcium, magnesium, strontium, or barium to water to create the solution having a selected salinity lower than the Type III or Type II(+) solution.

12. The method of claim 1, wherein the salinity of the Type III or II(+) regime is about 25% to about 150% greater than the salinity of the Type II(−) oil-in-water microemulsion.

13. The method of claim 1, wherein the solution having a selected salinity lower than the Type III or Type II(+) regime is fresh water.

14. The method of claim 1, wherein the surfactant, oil and water mixture further comprises salt.

15. A method for producing a homogeneous oil-in-water microemulsion comprised of oil, brine and surfactant for recovering crude oil and hydrocarbons from underground hydrocarbon formations, which comprises:

mixing a surfactant, an oil and water to create a surfactant, oil and water mixture of selected concentrations;

said oil having an alkane carbon number about 50% to about 300% higher than the alkane carbon number of the crude oil to be recovered;

adding a sufficient amount of sodium chloride to the surfactant, oil and water mixture to drive the mixture into a Type III or Type II(+) phase regime having a salinity about 25% to about 150% greater than the salinity of the final oil-in-water microemulsion; and mixing a sufficient amount of fresh water with the Type III or Type (II+) regime to invert the phase environment of the Type III or Type II(+) regime into a Type II(−) oil-in-water microemulsion.

* * * * *